United States Patent [19]

Devin

[11] Patent Number: 5,452,675
[45] Date of Patent: Sep. 26, 1995

[54] BOAT HULL

[75] Inventor: Neville J. Devin, Queensland, Australia

[73] Assignee: Nevid Nominees Pty Ltd., Australia

[21] Appl. No.: 146,039

[22] PCT Filed: Apr. 24, 1992

[86] PCT No.: PCT/AU92/00186

§ 371 Date: Oct. 28, 1993

§ 102(e) Date: Oct. 28, 1993

[87] PCT Pub. No.: WO92/19489

PCT Pub. Date: Nov. 12, 1992

[30] Foreign Application Priority Data

Apr. 29, 1991 [AU] Australia .................. PK5880

[51] Int. Cl.⁶ .................................................. B63B 1/32
[52] U.S. Cl. .................................................. 114/291
[58] Field of Search .................................. 114/271, 274, 114/289, 288, 291

[56] References Cited

U.S. PATENT DOCUMENTS

| | | |
|---|---|---|
| 1,396,831 | 11/1921 | Gardner . |
| 1,831,339 | 11/1931 | Brush . |
| 2,791,195 | 5/1957 | Almqvist et al. ............. 114/291 |
| 3,382,833 | 5/1968 | Wukowitz ................... 114/291 |
| 3,547,064 | 12/1970 | Glass . |
| 4,655,157 | 4/1987 | Sapp ........................ 114/291 |
| 5,140,930 | 8/1992 | Lund ........................ 114/291 |
| 5,191,853 | 3/1993 | Adler ....................... 114/291 |

FOREIGN PATENT DOCUMENTS

| | | |
|---|---|---|
| 583590 | 2/1986 | Australia . |
| 575480 | 5/1986 | Australia . |
| 575493 | 8/1986 | Australia . |
| 68600/87 | 2/1987 | Australia . |
| 585713 | 5/1987 | Australia . |
| 17654/88 | 12/1988 | Australia . |
| 55933/90 | 11/1990 | Australia . |
| 410034 | 2/1925 | Germany . |
| 89/02846 | 4/1989 | WIPO . |
| 8800818 | 4/1989 | WIPO . |

Primary Examiner—Stephen Avila
Attorney, Agent, or Firm—Amster, Rothstein & Ebenstein

[57] ABSTRACT

There is provided a boat hull 10 having a keel portion 11, a transom 12 and a deadrise portion 13. The deadrise portion 13 of the hull 10 has a recess 15 in the region of the transom 12 having a substantially planar upper surface 17 and bounded by side walls 20 and leading edges 21. The length of the recess is selected to be about 20% of the overall length of the boat hull 10. The depth of the recess 15 is selected to be about 10% of the length, and is configured such that the upper surface 17 is disposed at an angle substantially parallel to the water trailing from the leading edges 21 when the boat is on the plane. A step 22 is provided such that the upper surface 17 may break contact with the water as the hull accelerates, and the angle β of the leading edges 21 is selected such that the leading edges 21 are substantially parallel to the water surface. A vent 23 is provided connecting the recess 15 to the atmosphere as a vacuum breaker. Advantages include better speed per unit horsepower on the plane compared with prior art hulls with a decrease in fuel consumption. Stability at rest and at speed and improved ride are also advantages. Increased buoyant lift at low speeds and rest relative to the prior art modified hulls, and a decrease in draft, reduces the need for an outboard well to stop water entry.

10 Claims, 3 Drawing Sheets

BOAT HULL

This invention relates to a boat hull.

This invention has particular but not exclusive application to outboard motor powered planing boat hulls, and for illustrative purposes reference will be made to such application. However, it is to be understood that this invention could be used in other applications, such as inboard powered planing vessels and airboats.

In general, outboard motor powered boats have evolved from hull shapes generally designed for inboard power. Such hulls generally include a bottom part including a keel extending from stem to transom, the keel and its immediate surrounds providing a planing surface at speed. One disadvantage of this traditional type of planing hull is the disruption of the water behind the planing surface, which leads to propeller inefficiency. Of course, in single motor applications, it is generally unavoidable that the planing surface precede the propeller along the centreline of the hull.

It has been proposed to partially overcome the disadvantages of traditional hull design by use of an extended transom or pod. However, the extended transom or pod places the weight of the outboard significantly behind the normal position relative to both the centre of gravity of the assembled rig and the planing surface at speed, disturbing the balance of the boat.

As an improvement in the traditional planing hull and avoiding the disadvantage of pods or extended transoms, it has been proposed to step the transom to the keel of the hull to separate the keel from the propeller. In general such stepped designs include the underside of the step as part of the planing surface or at least part of the bearing surface under displacing conditions. Accordingly, such surfaces are generally provided with strakes and other interactive protuberances. Australian Patent Application No. 17654/88 discloses a hull having a transverse step of generally horizontal disposition and extending from the transom for approximately 5 to 15% of the waterline length of the hull ahead of the transom. It has been found that the disclosed apparatus when planing interacts with the surface 17 as much as the keel 11, generating spray and turbulence ahead of the propeller, and thus providing a source of inefficiency.

The present invention aims to alleviate the above disadvantage of conventional boat hulls and further aims to provide an improvement over current stepped transom designs, and to provide a boat hull which will be reliable and efficient in use. Other objects and advantages of this invention will hereinafter become apparent.

With the foregoing and other objects in view, this invention in one aspect resides broadly in a boat hull of the type including a keel, a transom, and a recess extending forward from said transom, said recess extending ahead to relieve said keel for substantial part of the waterline length of the hull.

The hull may be of any suitable type including monohulls and multihulls. Where a multihull or power cat type hull is required, a recess may be provided for each hull or keel or alternatively the recess may extend across both keels.

Preferably, the recess relieves the keel forward of the transom for at least 25% of the waterline length of the boat at planing speeds, with it being particularly preferred that the recess relieve the keel ahead of the transom for at least 40% of the planing waterline length. Typically, relief of the keel for 40% of the waterline length on the plane will amount to approximately 25% of the waterline length under displacing conditions. For typical deep-V type hulls, such criteria will translate to a recess length of at least 20% of the overall length, depending on the gross weight, speed and deadrise angle of the hull.

Preferably, the recess is configured such that at planing speeds the upper surface of the recess is substantially clear of the water surface. This provides for relatively uninterrupted water for the propeller, as well as decreasing the wetted area of the hull on the plane. A performance improvement, thought to be caused by the decreased wetted surface area when the boat is driven above planing speed, is noticeable when the upper surface of the recess comes clear of the water.

A further performance gain appears to be obtained by the aforesaid relatively undisturbed water in front of the propeller, in a manner thought to be analogous to that achieved with an extended transom or pod. In this area the advantage over a pod is that the distance between where the boat touches the water in front of the propeller and the propeller itself is increased significantly over that of the traditional hull, without disturbing the balance of the boat.

Accordingly, in a further aspect this invention resides broadly in a boat hull of the type including a keel, a transom, and a recess extending forward from said transom to relieve said keel for substantial part of the waterline length of the hull, wherein the upper surface of said recess is clear of the water at planing speeds.

In order to facilitate the desired clearance without an excessive step it is preferred that upper surface of the recess be inclined rearward and upwards from the step. Preferably, the inclination of the step is selected such that the upper recess surface at planing speeds is at least parallel to and clear of the water. Of course, the surface may be more inclined than is necessary, although this may result in a diminution of the transom dimensions and accordingly the motor mounting area, as well as a diminution of the interior space within the hull. In a typical application, an inclination such as that described by a recess having a depth approximating 10% of the length of the preferred recess has been found to be adequate for typical planing hulls, although this will of course depend on the gross weight, speed, deadrise angle and planing angle of a particular hull.

Preferably, the recess is vented to the top of the hull or to the side to assist in breaking the suction of the upper surface of the recess to the water as the recess comes clear of the water. In some high speed applications, the upper surface of the recess may be so configured as to clear the water surface at a selected speed above the lowest planing speed. The vent allows the false bottom to be released at a lower speed than it otherwise would but once released it is believed that the vent has no further significant effect.

Preferably, the upper surface of the recess is a plane surface to avoid inadvertant interaction with the water surface in the planing condition, although the surface may be provided with reinforcing ribs where these are deemed necessary to provide adequate strength or stability. Where such ribs are necessary, these may be provided within the hull rather than disturb the recessed upper surface.

The leading edge of the recess is preferably such that the end elevation of the leading edge is substantially horizontal such that water leaving the edge is directed rearwardly and as close to horizontal as possible, thus avoiding as far as possible the interaction of the trailed water with the hull. Accordingly, in the case of conventional V and deep-V hull shapes it is preferred that the leading edge of the recess taper outward and rearward of the keel to present the desired substantially horizontal end view when the hull planes.

It is also preferable that the recess is bounded at its sides by downwardly depending hull side portions, the hull side portions providing greater length of water contact in turns than when the hull is moving straight ahead. This provides a desirable increase in lateral stability in the turns by maximizing the length of the effective "keel" in the turns. Lateral stability limitations have been found to be a disadvantage of apparatus such as that disclosed in Australian Patent No. 585713 which proposes a full width transverse step, where light-construction boats are provided with relatively large outboard motors. Preferably, the downwardly depending hull side portions define sides of the recess between its leading edge and the transom which are disposed outward from said leading edge to minimize water contact. However, in the case of high speed, lightweight hulls the angle preferably approaches one parallel to the centreline to promote turn stability. The width of the recess at the transom will accordingly preferably vary in order to optimise the above criteria, with light, fast hulls tending to wider recesses with recess sides tending to straight, and heavier loads preferably having narrower recesses and more angled sides. A typical planing hull may tend to a recess width of approximately 50% of beam, depending on speed, weight and the need to turn at high speed without cavitation, In order that this invention may be more easily understood and put into practical effect, reference will now be made to the accompanying drawings which illustrate a preferred embodiment of the invention, wherein:

Figure 1:
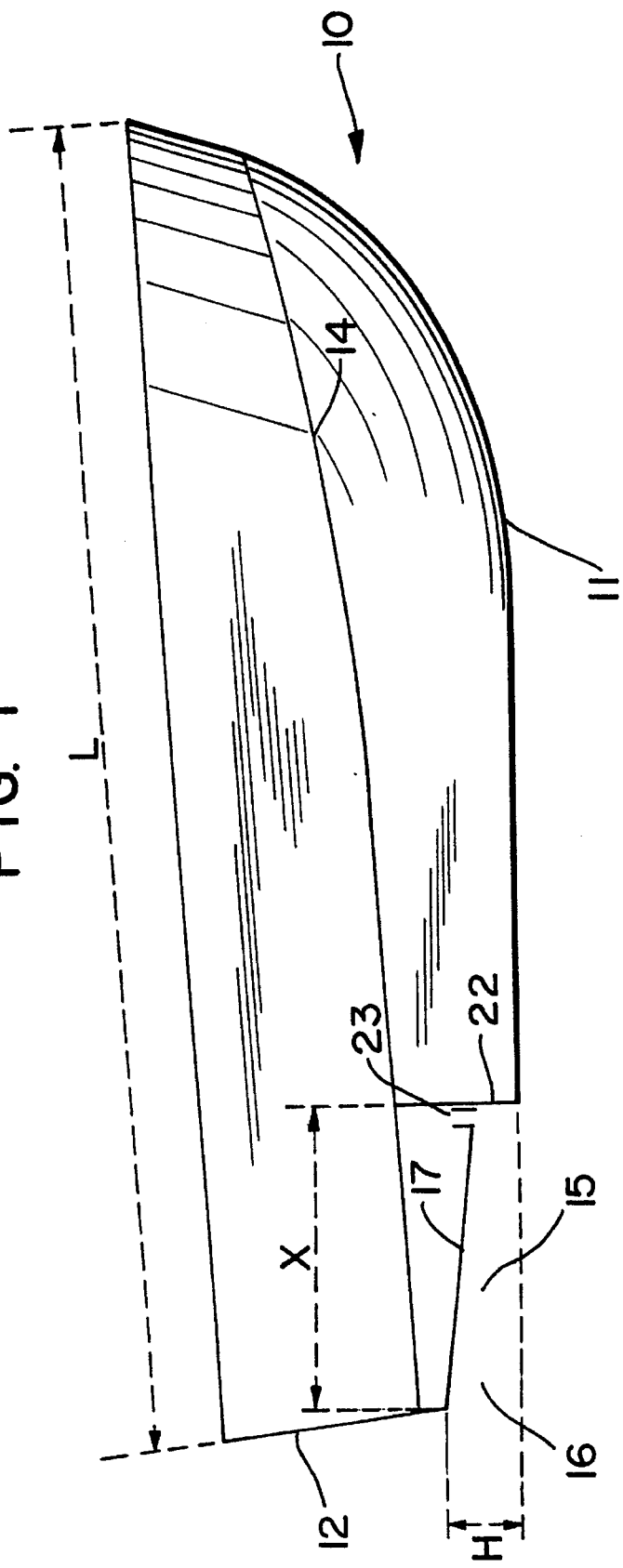
FIG. 1 is a side sectional view of a boat hull in accordance with the present invention.
Figure 2:
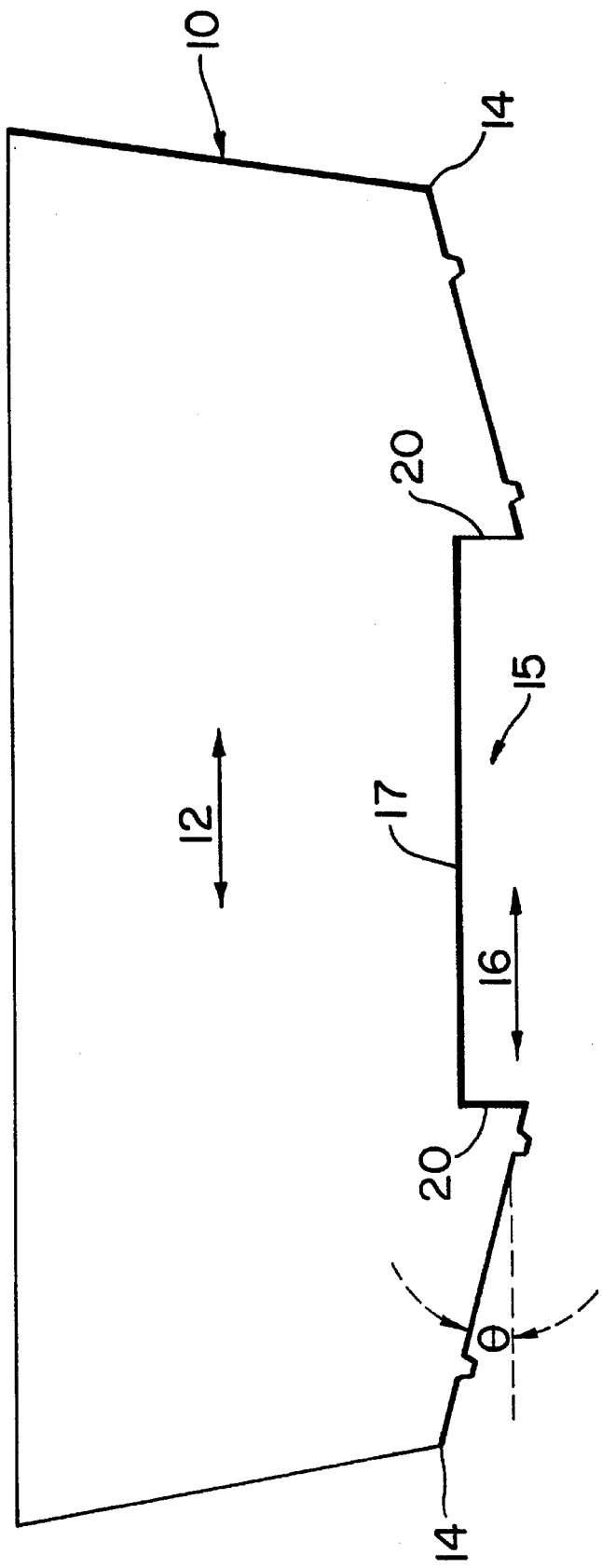
FIG. 2 is a view of the transom region of the boat hull of FIG. 1.
Figure 3:
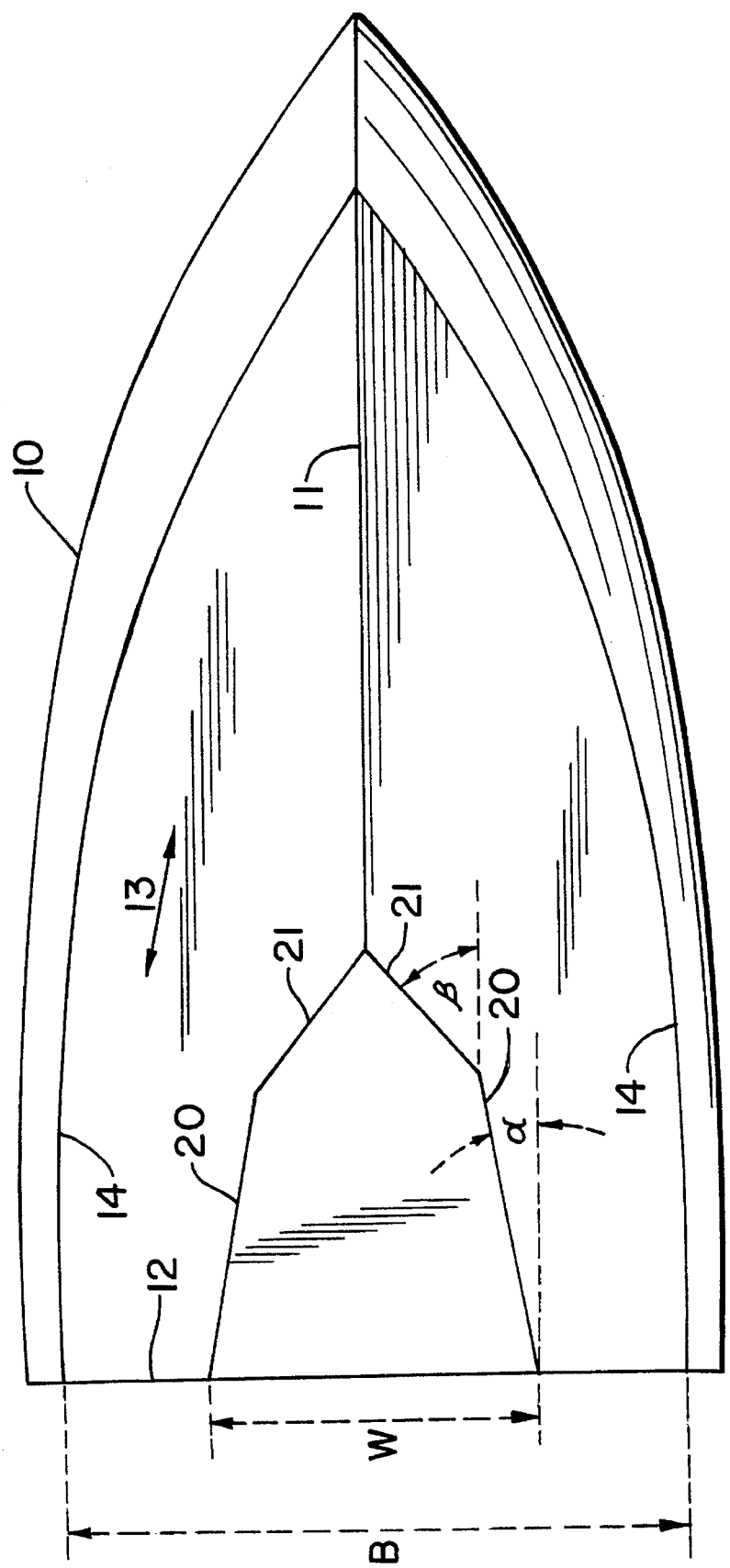
FIG. 3 is a bottom plan view of the boat hull of FIGS. 1 and 2.

In the figures, there is provided a boat hull 10 having a keel portion 11, a transom 12 and a deadrise portion 13 disposed between the keel portion 11 and a chine 14. The deadrise portion 13 of the hull 10 has a recess 15 in the region of the transom 12, the recess 15 providing an opening 16 in the transom 12. The recess has a substantially planar upper surface 17 and is defined by side walls 20 and leading edges 21 disposed symmetrically about the centreline of the hull 10.

The length X of the recess is selected to be about 20% of the overall length L of the boat hull 10. The depth H of the recess 15 is selected to be about 10% of the length X such that the upper surface 17 is disposed at an angle substantially parallel to the water trailing from the leading edges 21 when the boat is on the plane. The forward end of the recess 15 meets the keel portion 11 at a step 22 such that the upper surface 17 may break contact with the water as the hull accelerates onto the plane and remains substantially clear of the water thereafter.

The angle β of the leading edges 21 is in this embodiment selected such that the leading edges 21 are substantially horizontal, that is, parallel to the water surface.

Additionally, the width W of the recess is selected to be approximately 50% of the beam B at the transom 12 such that, at the deadrise angle φ of the hull 10 illustrated, sufficient sidewall 20 exists to provide for stability in turns, whilst sufficient flotation exists at the transom 12 to support the vessel at rest and low speed. This configuration determines the angle ã of the side walls 20.

A vent 23 is provided connecting the recess 15 to the atmosphere such that the tendency to form a vacuum resisting elevation of the upper surface 17 away from the water surface 9 is substantially eliminated. Strakes 24 are provided on the deadrise portion 13 in the region of the transom 12 and extend forward to further enhance stability in turns at speed.

Development on a high sided 4.0 m monohull aluminium boat modified in accordance with the above embodiment exhibited increased speed with a 270 kg load (excluding boat weight), relative to the unmodified boat, from just under 50 kph to over 60 kph with a 30 HP motor. Cruising fuel consumption decreased by approximately 20%, and full throttle fuel consumption decreased by 15%. Stability at rest and at speed was improved relative to prior art transom pod and full width recess boats because the major flotation at the transom of the present modified boat is carried well outboard of each side of the centreline. Since less power is required for a given speed, motor cost and weight may be decreased relative to the unmodified boat.

Draft was decreased by more than the vertical height of the transom cut-out because the lack of water disturbance in front of the propeller allows it to work efficiently without cavitation. The aforementioned 4.0 m boat has the motor mounted 150 mm higher than standard and the cavitation plate runs on the water surface. As an alternative, a standard mounting position may be adopted for motors of decreased motor shaft lengths, resulting in lower outboard motor cost.

The ride was improved over the unmodified boat due to the decreased surface area of contact with the water. Additionally, the higher engine mounting height relative to the prior art modified hulls reduces the need for an outboard well to stop water entry. Accordingly, for the present type of hull and on many boats the cost of the motor well is avoided at a saving of more than the cost of modification or manufacture in accordance with the present invention.

A 3.7 meter conventional aluminium boat was performance tested and then modified in accordance with the present invention and tested again. The conventional vessel is supplied to the boat retailing industry with quantitative performance data relating to speeds attainable for a given rated output. Both powerhead power outputs and prop rated outputs are used. In order to provide a quantitative relation between the hulls at varying power, each hull was tested with a 15 HP powerhead rated motor and a 30 HP prop rated motor, each test being conducted under standard conditions, that is, at a load of 160 kg starting payload (persons, fuel and standard safety and boat handling gear) and taking the average of two-way runs to ameliorate wind and tide effects.

The results of the test are as follows:

| BOAT TYPE | HORSEPOWER | SPEED (kph) |
| --- | --- | --- |
| Standard | 15 | 35.2 |
| Standard | 30 | 47.7 |
| Modified | 15 | 37.4 |
| Modified | 30 | 53.4 |

The results of the above comparative test indicate, with reference to the manufacturers performance tables, that the 3.7 meter boat hull in accordance with the present invention attains a performance level with the aforementioned 15 and 30 horsepower units equivalent to a standard hull powered by 18 and 40 horsepower units respectively.

An echo sounder transducer can be mounted behind or through the upper surface in a location which provides both protection from impact with floating debris and grounding protection.

A further advantage provided by boat hulls in accordance with the present invention lies in the ability to manufacture the hulls in alloy or fibreglass with a deeper V-form, thus providing a better ride. Traditionally, alloy small craft are manufactured with a V angle of 15°–16° any greater angle being generally precluded by the loss of stability of the light alloy hull, compared with an angle of 22°–23° usable in heavier fibreglass hulls. It has been surprisingly determined that hulls in accordance with the present invention may be manufactured with a V angle substantially the same as for a fibreglass boat, thus improving ride and comfort without loss of stability. The higher motor mount height also significantly decreases draft, in the 3.7 meter embodiment by an amount of 125 mm. This is particularly beneficial when the vessel is required to operate under conditions, such as in estuaries, shallow bays and areas of large tidal variation.

It will of course be realised that while the above has been given by way of illustrative examples of this invention, all such and other modifications and variations thereto as would be apparent to persons skilled in the art are deemed to fall within the broad scope and ambit of this invention as is herein set forth.

I claim:

1. A boat hull of the stepped type including a keel having a planing surface adapted to substantially support the hull at planing speeds, downwardly depending hull side portion disposed on each side of said keel and extending aft to a transom, and an upper surface extending rearward from the step of said keel, said step, side portions and upper surface defining a recess opening through and extending forward from said transom to said step in said keel, said recess relieving said keel for a substantial part of the waterline length of the hull and configured such that said upper surface at planing speeds is substantially clear of the water, said recess being provided with vent means whereby said recess is vented to atmosphere as said hull approaches planing speed.

2. A boat hull according to claim 1, wherein said recess relieves the keel forward of the transom for at least 40% of the waterline length of the boat hull at planing speeds.

3. A boat hull according to claim 1, wherein said recess relieves the keel forward of the transom for at least 25% of the waterline length of the boat hull under displacing conditions.

4. A boat hull according to claim 1, wherein the upper surface of said recess is a plane surface.

5. A boat hull according to claim 1, wherein said downwardly depending hull side portions define sides of the recess between its leading edge and the transom which are disposed outward from said leading edge.

6. A boat hull according to claim 1, wherein the leading edges of said recess are formed at the hull surface and taper outward and rearward of said step, the rear elevation of said leading edges presenting a substantially horizontal line when said hull is in a planing attitude such that water leaving the leading edges is directed rearwardly and substantially horizontally.

7. A boat hull according to claim 1, wherein said vent means comprises said upper surface being inclined rearward and upwards from the step, such that said upper surface at planing speeds is approximately parallel to and clear of the water, and wherein said recess communicates with the atmosphere through said transom.

8. A boat hull according to claim 1, wherein said recess is vented through the top or side of the hull.

9. A boat hull according to claim 1, wherein said downwardly depending hull side portions are disposed to provide for greater length of water contact in turns than when the hull is moving straight ahead.

10. A boat hull including a keel having a planing surface adapted to substantially support the hull at planing speeds, a transom, and a recess extending forward from said transom to relieve the keel forward of the transom for at least 40% of the waterline length of the boat hull at planing speeds, said recess having a substantially planar upper surface extending rearwardly of said step in the keel formed by said recess and configured to be substantially clear of and parallel to the water at planing speeds, the leading edges of said recess tapering outward and rearward of the keel to present a substantially horizontal line in rear elevation of the hull on the plane such that water leaving the edge is directed rearwardly and substantially horizontally, said recess being bounded at its sides by downwardly depending hull side portions providing greater length of water contact in turns than when the hull is moving straight ahead, said recess being provided with vent means whereby said recess is vented to atmosphere as said hull approaches planing speed.

* * * * *